United States Patent
Coppella et al.

[19]

[11] Patent Number: 5,968,653

[45] Date of Patent: Oct. 19, 1999

[54] CARBON-GRAPHITE/SILICON CARBIDE COMPOSITE ARTICLE

[75] Inventors: Steven J. Coppella; Laurence J. Thorwart; Mark E. Pfaff, all of St. Marys; David A. Erich, Ridgway, all of Pa.

[73] Assignee: The Morgan Crucible Company, plc, Windsor, United Kingdom

[21] Appl. No.: 08/585,147

[22] Filed: Jan. 11, 1996

[51] Int. Cl.⁶ .................................................. B32B 9/00
[52] U.S. Cl. .................. 428/408; 428/306.6; 428/312.6; 428/323; 428/328; 428/446; 428/448; 428/614; 428/627; 428/698; 428/699; 501/90; 501/99; 501/100; 501/126; 427/113; 427/226; 427/249; 427/250; 264/44; 264/63
[58] Field of Search ...................................... 428/328, 408, 428/698, 699, 323, 614, 545, 446, 448, 627, 367, 306.6, 312.6; 427/249, 250, 229, 226, 376.7, 383.5, 376.6, 228, 343, 113; 501/90, 88, 99, 87, 127, 126, 100; 264/63, 44; 228/121, 124.5

[56] References Cited

U.S. PATENT DOCUMENTS

| | | |
|---|---|---|
| Re. 30,286 | 5/1980 | Coppola et al. . |
| 2,609,318 | 9/1952 | Swentzel . |
| 2,614,946 | 10/1952 | Proudfoot . |

(List continued on next page.)

FOREIGN PATENT DOCUMENTS

| | | |
|---|---|---|
| 0 145 496 | 6/1985 | European Pat. Off. . |
| 0 486 336 | 5/1992 | European Pat. Off. . |
| 0 500 447 | 8/1992 | European Pat. Off. . |
| 0 522 945 | 1/1993 | European Pat. Off. . |
| 22 34 924 | 1/1974 | Germany . |
| 33 29 225 | 2/1984 | Germany . |
| 62-82047 | 4/1987 | Japan . |
| 62-132785 | 6/1987 | Japan . |
| 62-138377 | 6/1987 | Japan . |
| 63-011559 | 1/1988 | Japan . |
| 63-9781 | 1/1988 | Japan . |
| 63-26421 | 2/1988 | Japan . |
| 63-92915 | 4/1988 | Japan . |
| 63-163026 | 7/1988 | Japan . |
| 63-186076 | 8/1988 | Japan . |
| 63-260861 | 10/1988 | Japan . |
| 63-265850 | 11/1988 | Japan . |
| 64-37468 | 2/1989 | Japan . |
| 11 72290 | 7/1989 | Japan . |
| 21 50024 | 6/1990 | Japan . |
| 21 92464 | 7/1990 | Japan . |
| 22 55581 | 10/1990 | Japan . |
| 365577 | 3/1991 | Japan . |
| 32 15374 | 9/1991 | Japan . |
| 32 15375 | 9/1991 | Japan . |
| WO 94/18141 | 8/1994 | WIPO . |
| WO 95/23122 | 8/1995 | WIPO . |

OTHER PUBLICATIONS

Pure Industries, Inc., Pure Carbon Co., Brochure entitled "The Carbon Component Specialist".

Pure Industries, Inc., Pure Carbon Co., Brochure entitled "Rubbing Components for Mechanical Seals".

(List continued on next page.)

*Primary Examiner*—Deborah Jones
*Assistant Examiner*—Abraham Bahta
*Attorney, Agent, or Firm*—Kilpatrick Stockton, LLP; Dean W. Russell; Bruce D. Gray

[57] ABSTRACT

A carbon-graphite/silicon carbide composite article is provided. The composite article includes a carbon-graphite body intimately bonded to a dense silicon carbide body by a transition/bonding region which links the two bodies. The transition/bonding region between the carbon-graphite body and the silicon carbide body typically includes a layer rich in silicon metal and a small silicon carbide/silicon metal/carbon graphite area where some of the carbon-graphite from the carbon-graphite body has been converted to silicon carbide. The carbon-graphite body may also include a variety of impregnants.

17 Claims, 6 Drawing Sheets

U.S. PATENT DOCUMENTS

| | | |
|---|---|---|
| 2,614,947 | 10/1952 | Heyroth . |
| 2,636,826 | 4/1953 | Nicholson . |
| 2,691,605 | 10/1954 | Hediger . |
| 2,784,112 | 3/1957 | Nicholson . |
| 2,887,393 | 5/1959 | Taylor . |
| 2,897,572 | 8/1959 | Hansen . |
| 2,907,972 | 10/1959 | Schildhauer et al. . |
| 2,916,460 | 12/1959 | Van Der Beck, Jr. . |
| 2,938,807 | 5/1960 | Anderson et al. . |
| 2,941,962 | 6/1960 | Van Der Bock, Jr. . |
| 3,035,325 | 5/1962 | Nicholson et al. . |
| 3,051,564 | 8/1962 | Dremming . |
| 3,094,679 | 6/1963 | O'Connor et al. . |
| 3,108,887 | 10/1963 | Lenie et al. . |
| 3,166,380 | 1/1965 | Kuhn . |
| 3,175,884 | 3/1965 | Kuhn . |
| 3,189,472 | 6/1965 | Taylor . |
| 3,189,477 | 6/1965 | Shaffer . |
| 3,205,043 | 9/1965 | Taylor . |
| 3,252,827 | 5/1966 | Rose et al. . |
| 3,305,372 | 2/1967 | Taylor . |
| 3,372,305 | 3/1968 | Mikulec . |
| 3,459,566 | 8/1969 | Wilson, Jr. et al. . |
| 3,480,395 | 11/1969 | McMullen et al. . |
| 3,513,019 | 5/1970 | Miller et al. . |
| 3,520,667 | 7/1970 | Taylor . |
| 3,765,300 | 10/1973 | Taylor et al. . |
| 3,796,564 | 3/1974 | Taylor et al. . |
| 3,808,012 | 4/1974 | Bailey et al. . |
| 3,852,099 | 12/1974 | Prochazka . |
| 3,853,566 | 12/1974 | Prochazka . |
| 3,859,399 | 1/1975 | Bailey et al. . |
| 3,924,034 | 12/1975 | Olcott . |
| 3,925,133 | 12/1975 | Olcott . |
| 3,925,577 | 12/1975 | Fatzer et al. ........................ 427/249 |
| 3,954,483 | 5/1976 | Prochazka . |
| 3,960,577 | 6/1976 | Prochazka . |
| 3,968,194 | 7/1976 | Prochazka . |
| 3,969,124 | 7/1976 | Stewart . |
| 3,993,602 | 11/1976 | Prochazka . |
| 4,004,934 | 1/1977 | Prochazka . |
| 4,017,319 | 4/1977 | Greskovich et al. . |
| 4,023,975 | 5/1977 | Prochazka . |
| 4,031,178 | 6/1977 | Johnson et al. . |
| 4,041,117 | 8/1977 | Prochazka . |
| 4,080,415 | 3/1978 | Coppola et al. . |
| 4,081,284 | 3/1978 | Prochazka et al. . |
| 4,108,929 | 8/1978 | Prochazka et al. . |
| 4,109,050 | 8/1978 | Mehan et al. . |
| 4,119,475 | 10/1978 | Prochazka et al. . |
| 4,119,689 | 10/1978 | Prochazka et al. . |
| 4,119,690 | 10/1978 | Prochazka et al. . |
| 4,120,731 | 10/1978 | Hillig et al. . |
| 4,120,827 | 10/1978 | Boos et al. . |
| 4,122,140 | 10/1978 | Greskovich et al. . |
| 4,122,155 | 10/1978 | Prochazka et al. . |
| 4,123,286 | 10/1978 | Coppola et al. . |
| 4,124,402 | 11/1978 | Greskovich et al. . |
| 4,124,403 | 11/1978 | Greskovich et al. . |
| 4,124,667 | 11/1978 | Coppola et al. . |
| 4,135,937 | 1/1979 | Murata et al. . |
| 4,135,938 | 1/1979 | Murata et al. . |
| 4,141,948 | 2/1979 | Laskow et al. . |
| 4,144,207 | 3/1979 | Ohnsorg . |
| 4,148,894 | 4/1979 | Hillig et al. . |
| 4,150,998 | 4/1979 | Morelock . |
| 4,179,299 | 12/1979 | Coppola et al. . |
| 4,207,226 | 6/1980 | Storm . |
| 4,209,474 | 6/1980 | Prochazka . |
| 4,225,356 | 9/1980 | Prochazka et al. . |
| 4,233,256 | 11/1980 | Ohnsorg . |
| 4,237,085 | 12/1980 | Smoak . |
| 4,238,433 | 12/1980 | Hillig et al. . |
| 4,240,835 | 12/1980 | Laskow et al. . |
| 4,279,656 | 7/1981 | Greskovich et al. . |
| 4,294,788 | 10/1981 | Laskow et al. . |
| 4,312,954 | 1/1982 | Coppola et al. . |
| 4,327,186 | 4/1982 | Murata et al. . |
| 4,332,755 | 6/1982 | Murata . |
| 4,346,049 | 8/1982 | Coppola et al. . |
| 4,374,792 | 2/1983 | Prochazka et al. . |
| 4,379,110 | 4/1983 | Greskovich et al. . |
| 4,385,020 | 5/1983 | Morelock . |
| 4,419,161 | 12/1983 | Hailey . |
| 4,455,385 | 6/1984 | Prochazka . |
| 4,524,138 | 6/1985 | Schwetz et al. . |
| 4,525,461 | 6/1985 | Boecker et al. ........................ 501/90 |
| 4,530,808 | 7/1985 | Renlund et al. . |
| 4,551,436 | 11/1985 | Johnson et al. . |
| 4,551,496 | 11/1985 | Renlund et al. . |
| 4,554,717 | 11/1985 | Vig et al. . |
| 4,571,414 | 2/1986 | Renlund et al. . |
| 4,649,022 | 3/1987 | Tischer et al. . |
| 4,659,002 | 4/1987 | Wallgren et al. . |
| 4,666,775 | 5/1987 | Kim et al. . |
| 4,676,940 | 6/1987 | Kim et al. . |
| 4,690,909 | 9/1987 | Okuno et al. ........................ 501/90 |
| 4,692,418 | 9/1987 | Boecker et al. ........................ 501/90 |
| 4,693,988 | 9/1987 | Boecker et al. . |
| 4,701,426 | 10/1987 | Okuno et al. . |
| 4,908,340 | 3/1990 | Frechette et al. . |
| 4,932,438 | 6/1990 | Kitmura et al. . |
| 5,114,886 | 5/1992 | Taukada . |
| 5,135,893 | 8/1992 | Dohi et al. ........................ 501/91 |
| 5,422,322 | 6/1995 | Chen et al. . |
| 5,580,834 | 12/1996 | Pfaff ........................ 501/90 |

OTHER PUBLICATIONS

Pure Industries, Inc., Pure Carbon Co., Brochure entitled "Bearings for Difficult Applications".

Pure Industries, Inc., Pure Carbon Co., Brochure entitled "Purebide Components for Demanding Applications".

Investigation of Ceramics for High Temperature Turbine Vanes Final Report, Mar. 1972, by Svante Prochazka, prepared under Contract N00019–71–C–0290 for Department of Navy.

"Investigation of Ceramics for High Temperature Turbine Vanes" Final Report, Dec. 1972, by Svante Prochzka, prepared under Contract N00019–72–C–0129 for Department of Navy.

"Investigation of Ceramics for High Temperature Turbine Vanes'" Final Report, Mar. 20, 1973–Dec. 19, 1973, by Svante Prochazka & Peter C. Smith, prepared under Contract N62269–73–C–0356 for Department of Navy.

"Investigation of Ceramics for High Temperature Turbine Vanes'" Final Report, Jan. 23, 1974–Oct. 23, 1974, by Svante Prochazka et al., prepared under Contract N62269–74–C–0255 for Department of Navy.

Investigation of Ceramics for High Temperature Turbine Components–Final Report, Dec. 1975, by Svante Prochazka et al., prepared under Contract N62269–75–C–0122 for Department of Navy.

Investigation of Ceramics for High Temperature Turbine Components–Final Report, Mar. 25, 1976–Mar. 25, 1977, by Curtis A. Johnson et a., prepared under Contract N62269–76–C–0243 for Department of Navy.

"Substitution of Ceramics for Ductile Materials in Design" Report by J.A. Coppola et al., presented at National Symposium on "Ceramics in the Service of Man", Jun. 7, 1976.

"Beta Silicon Carbide" Report by Peter T. B. Shaffer, Materials Research Bulletin, vol. 4, pp. S97–S106, 1969, proceedings of Silicon Carbide International Conference, University Park, PA, Oct. 20–23, 1968.

"Problems in Silicon Carbide Device Development" Report by Peter T.B. Staffer, Materials Research Bulletin, vol. 4. pp. S13–S24, 1969, proceedings of Silicon Carbide International Conference, University Park, PA, Oct. 20–23, 1968.

"Phase Stability of Silicon Carbide in the Ternary System Si–C–N" Report by A.R. Kieffer et al. Material Research Bulletin, vol. 4, pp. S153–S166, 1969, proceedings of Silicon Carbide International Conference, University Park, PA, Oct. 20–23, 1968.

"5.2.3 Silicon Carbide." pp. 5.2.3–1–.5.2.3–11.

Silicon Carbide–1973, edited by R.C. Marshall et al., pp. 343–402 420–426, University of Smith Carolina Press, 1974.

"Sintered Alpha Silicon Carbide Pump Bearings–Tribological Materials Optimization to Improve Reliability", by Heinrich Knoch, Joseph Kracker and William D. Long, Proceedings of the Tenth International Pump Users Symposium, Mar. 1993.

"Sintered Silicon Carbides with Controlled Porosity for Mechanical Face Seal Applications" by R. Divakar, STLE Lubrication, Journal of the Society of Tribologists and Lubrication Engineers, vol. 50, pp. 75–80, Presented at 48; Annual Meeting in Calgary, Alberta, Canada May 17–20, 1993.

Quarterly Progress Report No. 1, Report No. SRD–74–057, of contract N62269–74–C–0255, entitled "Investigation of Ceramics for High–Temperature Turbine Vanes," covering work performed from Jan. 25, 1974 to Apr. 23, 1974.

Semi–Annual Technical Report No. SRD–75–047 of contract N00014–74–C–0331, entitled "Ceramic Sintering," dated Apr. 1975.

Quarterly Progress Report No. 2, Report No. SRD–75–042, of contract N62269–75–C–0122, entitled "Investigation of Ceramics for High–Temperature Turbine Vanes," covering work performed from Jan. 19, 1975 to Apr. 18, 1975.

CARBON-GRAPHITE/SILICON CARBIDE COMPOSITE ARTICLE

FIELD OF THE INVENTION

This invention relates to the field of carbon-graphite/silicon carbide composite articles and more particularly to composite articles comprised of carbon-graphite bodies bonded to silicon carbide bodies.

BACKGROUND OF THE INVENTION

In the area of friction and seal components for demanding applications, seal designs are often compromised by the need to choose among materials which have exclusive and independent benefits, and sometimes conflicting characteristics. The seal designs are often compromised in material selection because, while some materials have beneficial properties in certain respects, the materials may have disadvantages, or less desirable characteristics, in other respects. For example, some seal materials (i.e. carbon/graphites) have self-lubricating properties, and therefore perform very well in dry run and process upset conditions. Typically, such materials also have a low modulus of elasticity, which allows the materials to deflect against the mating face of a seal (which is usually a high modulus ceramic). However, because of the low modulus, such materials lack strength and stiffness. Further, the materials also lack high oxidation resistance.

Other seal materials (e.g. self-sintered silicon carbides) have superior strength and a high modulus of elasticity, which provides the stiffness necessary to give the entire seal assembly stability and strength, and have high oxidation resistance. However, such materials are not self-lubricating. Therefore, the materials have poor dry running and/or process upset response characteristics.

SUMMARY OF THE INVENTION

The present invention includes a carbon-graphite/silicon carbide composite article. The composite article includes a carbon-graphite body intimately bonded to a dense silicon carbide body by a transition/bonding region which links the two bodies. The transition/bonding region between the carbon-graphite body and the silicon carbide body typically includes a layer rich in silicon metal and a small silicon carbide/silicon metal/carbon graphite region where some of the carbon-graphite from the carbon-graphite body has been converted to silicon carbide. The carbon-graphite body, which typically would be used as a tribological material in a seal or bearing application, may also include a variety of impregnants to further enhance the tribological, physical or chemical characteristics of the body, or to eliminate the porosity of the body for seal applications.

In the production of the composite article of the present invention, the carbon-graphite body and the silicon carbide body are first manufactured separately. The two materials are then assembled and reacted to convert the silicon carbide body into a dense body and to produce the transition/bonding region which provides intimate adhesion between the previously separate bodies. Some overlap of part of the cross sections of the bodies is provided (i.e. so that one of the bodies is partially embedded in, or is keyed into, the other) to allow sufficient adhesion and shear strength to withstand application forces. The overlap may, for example, be provided by fitting part of one body into a race or groove formed in the other. After reaction of the bodies and formation of the composite article, the carbon-graphite body, which is porous, can then be impregnated with an impregnant to further enhance the tribological, physical or chemical characteristics of the body, or to eliminate the porosity of the body.

The resultant composite article of the present invention is a stiff, strong and self-lubricating article particularly suitable for seal and bearing members. The unique characteristics of the composite article combine the superior strength, high modulus of elasticity and high oxidation resistance of silicon carbide with the lower modulus and self-lubricating characteristics of mechanical carbon-graphite. Further, in seal applications, because the silicon carbide body is separated from the rubbing surface of the material by the carbon-graphite body, the running temperature of the composite article is reduced in both normal and adverse conditions from that of a plain, e.g. reaction bonded, silicon carbide body. Thus, the opportunity for thermal shock, as well as catastrophic failure of seal/bearing assemblies, is reduced.

Further, the resultant article of the present invention is unique in that it does not compromise the structure of the silicon carbide by introducing flaws, such as graphite inclusions, into the silicon carbide which would weaken the structure of the silicon carbide body and lower its modulus of elasticity and strength.

BRIEF DESCRIPTION OF THE DRAWINGS

The present invention will be more fully understood from the following detailed description considered in conjunction with the accompanying drawings, in which.

DETAILED DESCRIPTION

The present invention includes a carbon-graphite/silicon carbide composite article. In the preferred embodiment, the composite article comprises a dense silicon carbide body; two interstitial regions: (1) a dense layer rich in silicon metal and (2) a small silicon carbide/silicon metal/carbon-graphite layer; and a carbon-graphite body. The microstructure of the carbon-graphite body is porous and can be impregnated with a variety of impregnants to further enhance the tribological-physical-chemical characteristics of the carbon-graphite body, or to eliminate the porosity for seal applications.

As can best be seen in FIGS. 1 and 2A–C, in the preferred embodiment the composite article of the present invention comprises a carbon-graphite body 10 bonded to a dense silicon carbide body 12. A transition/bonding region 14 joins the carbon-graphite body 10 to the silicon-carbide body 12. The transition/bonding region 14 comprises a layer of silicon metal 16 and an area 18 which includes inclusions of silicon carbide 20, silicon metal 22, and carbon-graphite 24. The silicon carbide 20 results from conversion of carbon-graphite and silicon metal during the bonding process. The carbon-graphite body 10 may also include a variety of impregnants, such as resins/polymers, metals, glasses or other inorganic moieties or materials to improve the tribological or other characteristics of the body, or to eliminate porosity in the carbon-graphite body.

Figure 1:
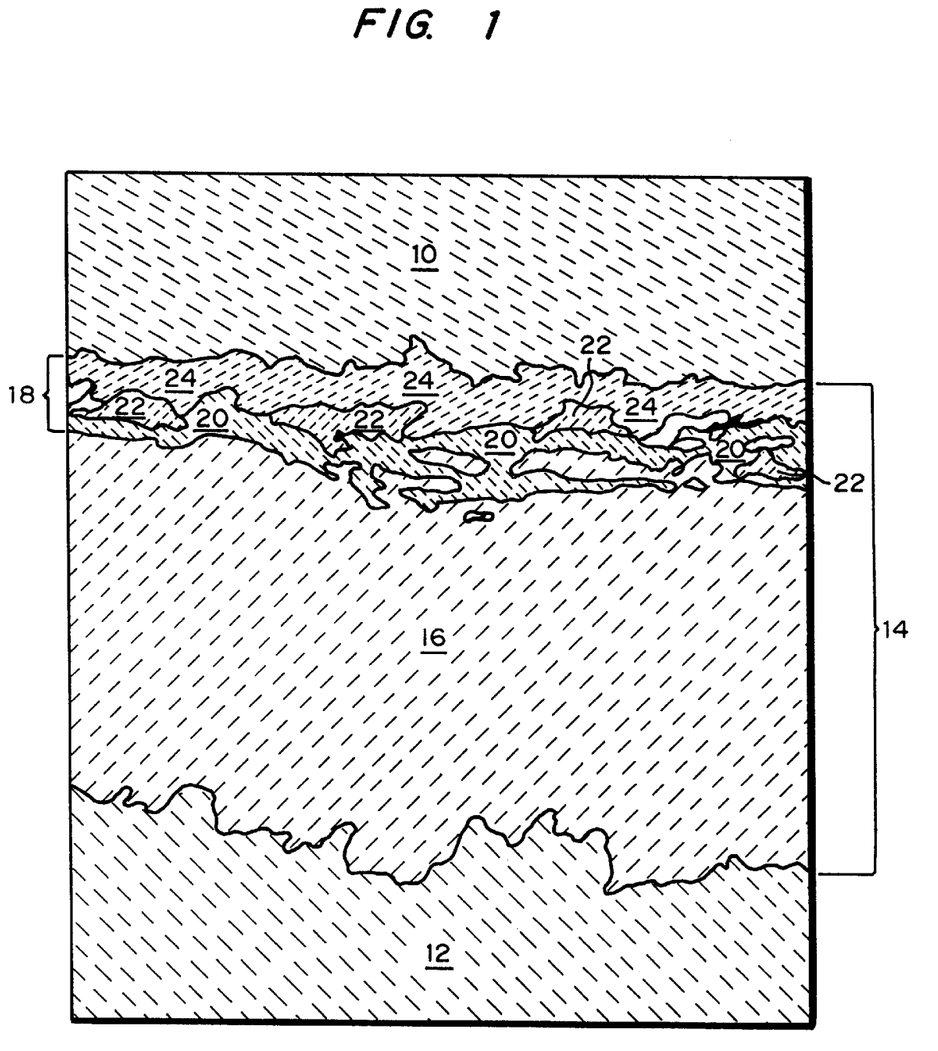
FIG. 1 is a detailed cross-sectional schematic representation of a carbon-graphite/silicon carbide composite article of the present invention.
Figure 2A:
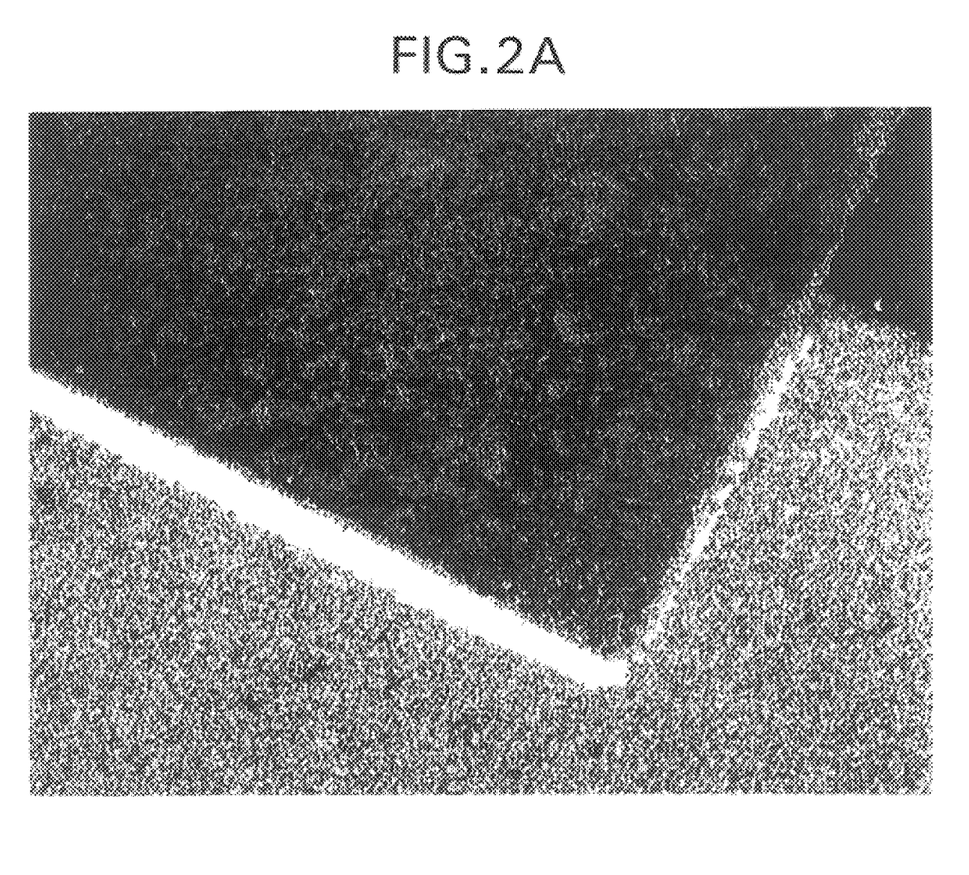
FIGS. 2A, 2B, and 2C are photomicrographs, taken at 50×, 100×, and 400×, respectively, of the composite article of FIG. 1.
Figure 2B:
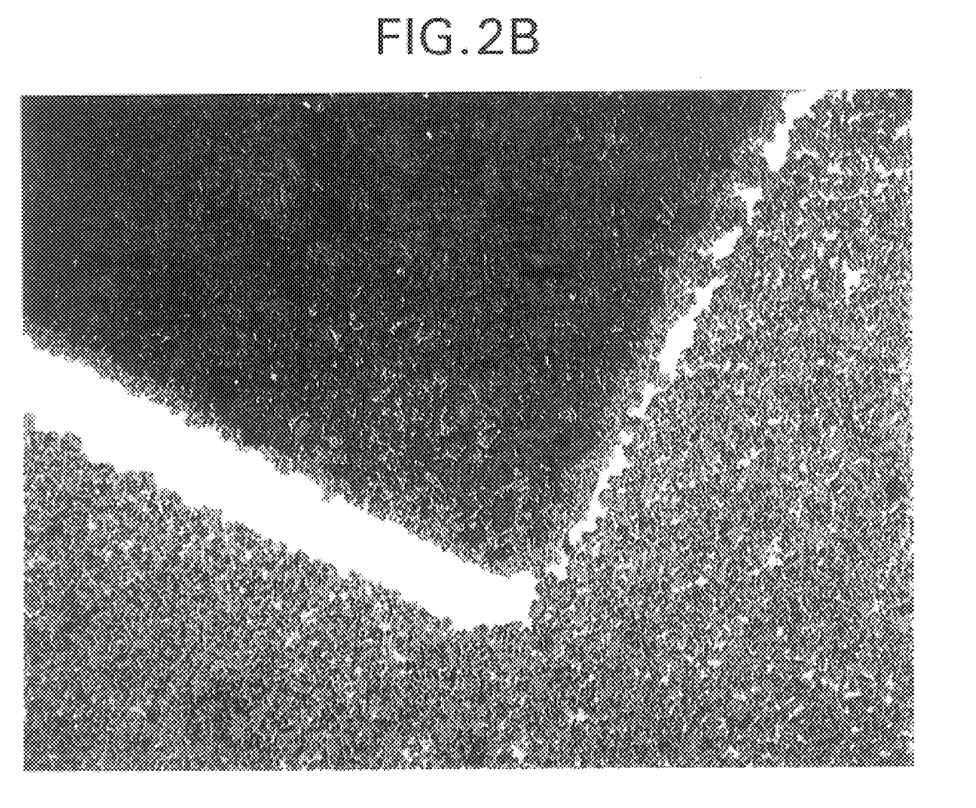
Figure 2C:
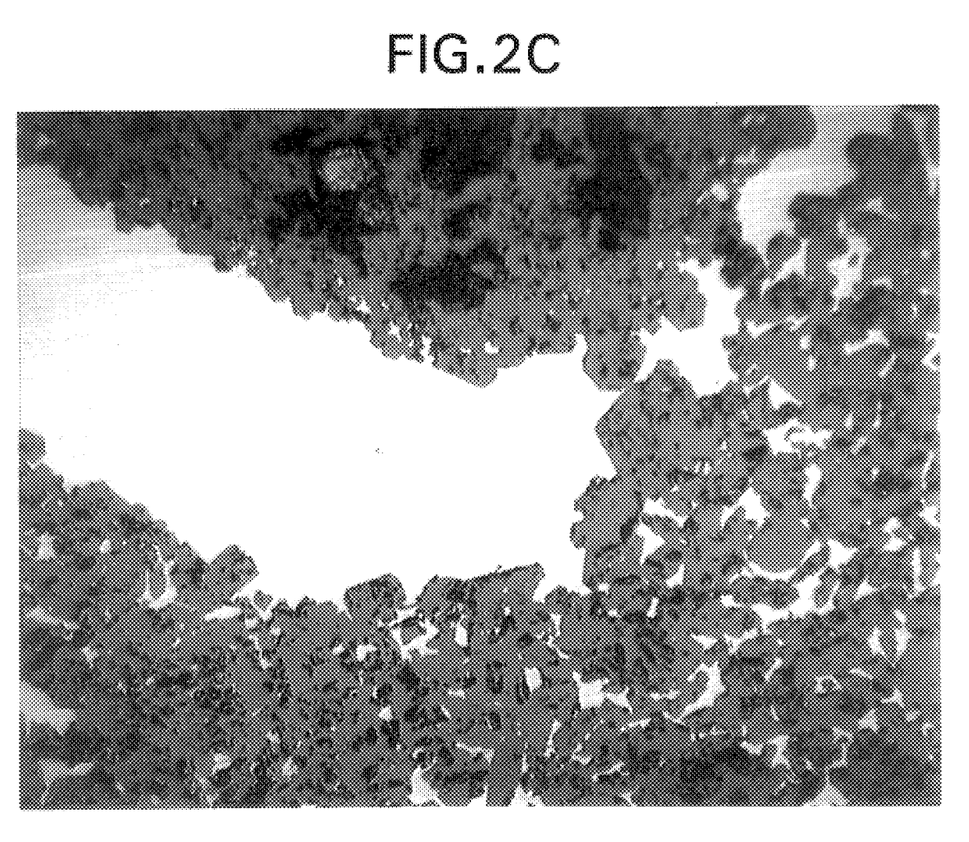
Figure 3:
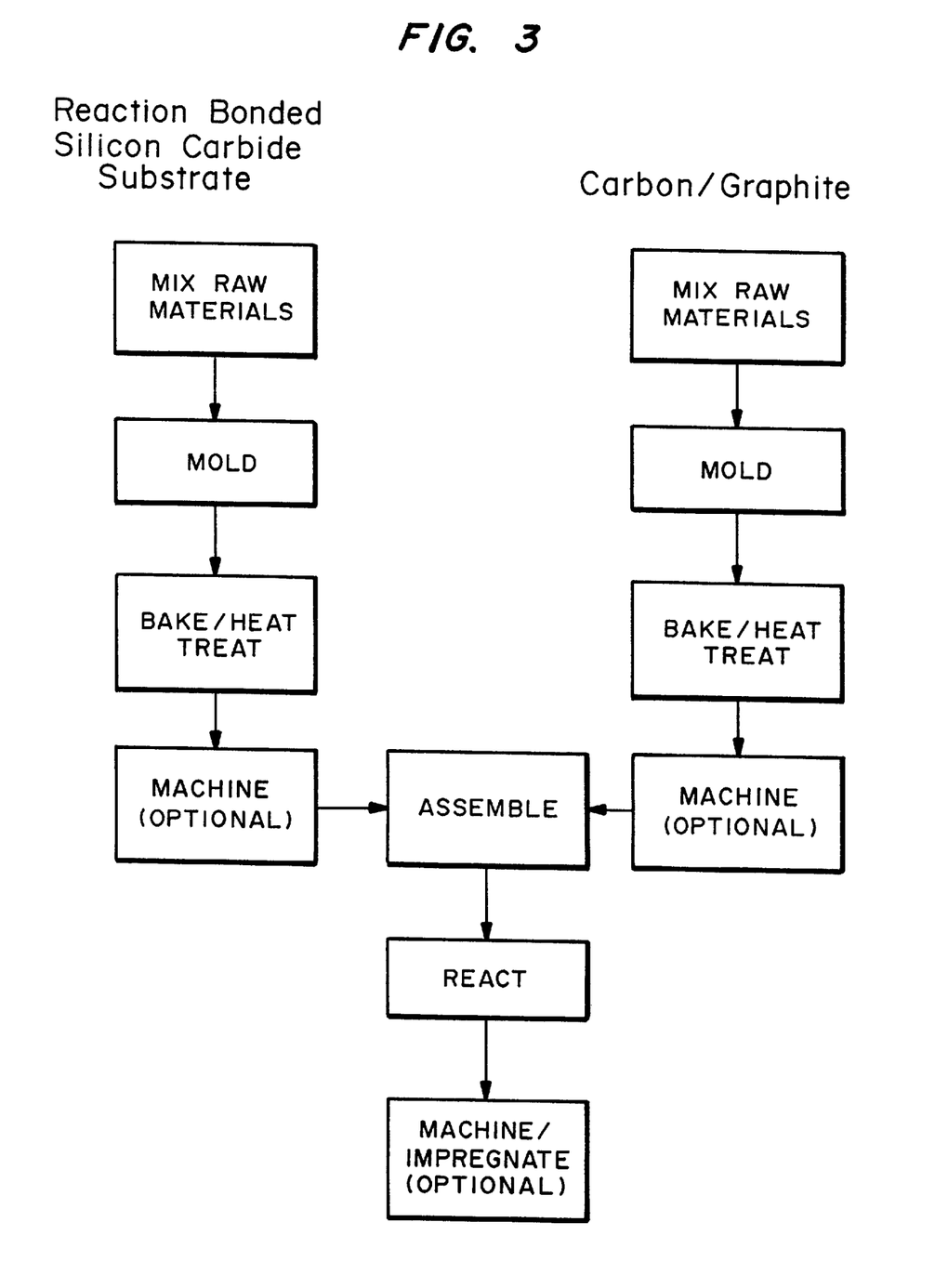
FIG. 3 is a schematic illustration of the process for producing the composite article of FIG. 1.

The process for producing the composite article of the present invention is shown schematically in FIG. 3. Manufacture of the composite article begins with separate production of the two individual bodies, the carbon-graphite body and the silicon carbide body, e.g. a reaction bonded silicon carbide body. The carbon-graphite body is manufactured in known manner by mixing fillers, such as carbons, graphites, inorganic additives and binders, having a particle size distribution that yields a moldable powder and a desired microstructure. The binders include coal tar pitch, petroleum pitch and/or resins. The mixture is then molded or compacted into a green body. After compaction, the green body is heated at an elevated temperature sufficient to carbonize the binder to yield a carbon-graphite body. The peak temperature must also be high enough to stabilize the body to minimize size changes during the subsequent bonding process. Any size change in the bonding process will cause deformation in the final product and possible weakening of the bond. The carbon-graphite body is then heat treated. The peak temperature can either be realized in the primary carbonization operation or in a subsequent heat treating process. Typically, the carbon-graphite body is then machined to produce a body with a desired size within allowable tolerances.

The silicon carbide body is manufactured in known manner. A reaction bonded silicon carbide body could, for example, be manufactured by mixing fillers (carbons, graphites, silicon carbide and temporary binders) having a particle size distribution that yields a moldable powder and desired microstructure. The body is then molded or compacted into a green body, which is then heated to carbonize the temporary binder to provide an intermediate strength to the body as well as to provide carbon for the subsequent bonding process. If necessary, the body can then be machined to a desired size within a desired tolerance.

The carbon-graphite body and the silicon carbide body are then assembled and reacted to intimately bond the carbon-graphite body to the silicon carbide body and to fully densify the silicon carbide body. The reaction process involves placing the assembled bodies onto a tray fitted with rails, together with elemental silicon metal which can rest between the rails, and heating the assembled bodies until the silicon becomes molten and wicks up the rails to infiltrate the assembly. While the silicon metal infiltrates the assembly, it reacts with the silicon carbide body. The metal also fills the interstitial space between the silicon carbide body and the carbon-graphite body and reacts slightly with the carbon-graphite body surface. This reaction forms a silicon carbide layer, with residual silicon metal existing between the bodies to bond them together after cooling.

Any silicon metal that wicks to the exterior of the carbon-graphite body can easily be removed later via machining. After removal of any such silicon carbide skin, the composite article may then be impregnated (using techniques common for porous carbon-graphite materials) either to eliminate the porosity in the carbon-graphite body or to improve the tribological or other characteristics of the body (or both). The composite body can then be further machined if necessary.

Figure 4A:
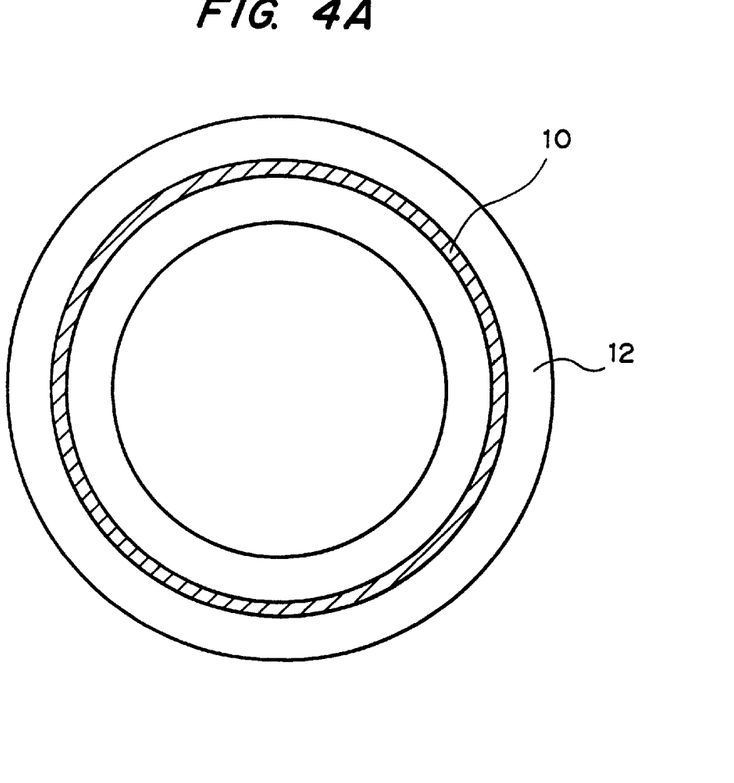
FIG. 4A is an orthogonal top view of an exemplary composition of the composite article of FIG. 1.
Figure 4B:
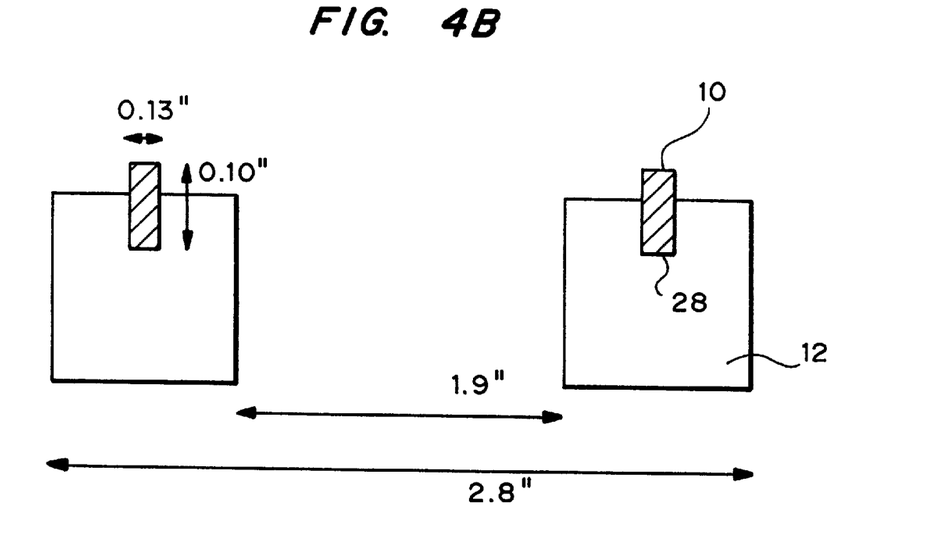
FIG. 4B is an orthogonal side sectional view of the composite article of FIG. 4A.

FIGS. 4A–B show an exemplary composite article in which a groove or race 28 has been machined in silicon carbide body 12 to accommodate carbon-graphite body 10. Carbon-graphite body 10 may be inserted into race 28 after both bodies 10 and 12 have been individually baked, heat treated, and machined as necessary. After assembly, bodies 10 and 12 may be reacted together and bonded with a layer of silicon metal as described above. As shown in FIGS. 2A–C and 4A–B, it is important that the carbon-graphite body and the silicon carbide body overlap in cross-section to ensure adequate bonding and bond shear strength.

The following examples illustrate the invention using a reaction bonded silicon carbide body. It would be clear to a person skilled in the art that a pressureless sintered silicon carbide body could be used in like manner, providing that the pressureless sintered silicon carbide has sufficient porosity to wick up silicon metal as described above.

EXAMPLE I

A composite article of the present invention as shown in FIGS. 4A–B was prepared from a reaction bonded silicon carbide body having the properties summarized in Table I (after being reacted) and a carbon-graphite body having the properties summarized in Table II (after being baked).

TABLE I

| | |
|---|---|
| Apparent Density, gm/cm$^3$ | 3.1 |
| Flexural Strength, psi | 40,000–4 pt. |
| Compressive Strength, psi | 400,000 |
| Modulus of Elasticity, psi | 56 × 10$^6$ |
| Porosity, % Volume | 0.1 |
| Permeability | Nil |
| Hardness, HK200 | 2300 |
| Temperature Limit: | |
| | |
| Oxidizing Atmosphere, ° F. | 2500 |
| Neutral Atmosphere, ° F. | 2500 |
| Coefficient of Thermal Conductivity, BTU/hr. ft$^2$ – ° F./ft. (at 70° F.) | 85 |
| Coefficient of Thermal Expansion, $\mu$-in/in ° F. (70 to 1500° F.) | 2.5 |

TABLE II

| | |
|---|---|
| Apparent Density, gm/cm$^3$ | 1.75 |
| Flexural Strength, psi | 9000 |
| Hardness, Scleroscope | 85 |
| Specific Resistance, ohm/inch cube | 0.0018 |
| Ash, % Weight | 8 |

After reaction as described earlier, a composite article of the present invention was produced.

EXAMPLE II

Another example of a composite article of the present invention as shown in FIGS. 4A–B was produced from a body of the reaction-bonded silicon carbide described in Table I (after being reacted) and a carbon-graphite body having the properties summarized in Table III (after being baked).

TABLE III

| | |
|---|---|
| Apparent Density, gm/cm$^3$ | 1.76 |
| Flexural Strength, psi | 7000 |
| Hardness, Scleroscope | 71 |
| Specific Resistance, ohm/inch cube | 0.0012 |
| Ash, % Weight | 4.6 |

EXAMPLE III

Another sample of a composite article of the present invention as shown in FIGS. 4A–B was prepared from a reaction-bonded silicon carbide body having the properties summarized in Table I (after being reacted) and a carbon-graphite body having the characteristics summarized in Table IV (after being baked).

TABLE IV

| Apparent Density, gm/cm$^3$ | 1.65 |
| --- | --- |
| Flexural Strength, psi | 5000 |
| Hardness, Scleroscope | 55 |
| Specific Resistance, ohm/inch cube | 0.0015 |
| Ash, % Weight | approx. 5 |

The above description is not intended to limit the present invention. Alternative embodiments are possible. Accordingly, the scope of the invention should be determined by the appended claims and their legal equivalence, not by the embodiments described and shown above.

What is claimed is:

1. A composite article comprising:
   a. a first body comprising reaction bonded silicon carbide;
   b. a second body of carbon-graphite; and
   c. a transition region joining the first and second bodies, comprising a layer of silicon metal.

2. A composite article according to claim 1 in which the transition region includes an area comprising inclusions of carbon-graphite, silicon metal, and silicon carbide.

3. A composite article according to claim 1 in which the second body includes at least one impregnant.

4. A composite article according to claim 1 in which the transition region further includes an area comprising inclusions of carbon-graphite and silicon carbide.

5. A composite article according to claim 1 in which the second body includes at least one impregnant.

6. A composite article according to claim 2 in which the second body includes at least one impregnant.

7. A composite article according to claim 3 in which the second body includes at least one impregnant.

8. A composite article consisting essentially of:
   a. a first body of reaction bonded silicon carbide;
   b. a second body of carbon-graphite; and
   c. a transition region joining the first and second bodies comprising a layer comprising silicon metal and a layer comprising silicon carbide, silicon metal, and carbon graphite.

9. A composite article consisting essentially of:
   a. a first body of silicon carbide;
   b. a second body of carbon-graphite;
   c. a transition region joining the first and second bodies comprising a layer comprising silicon metal and a layer comprising silicon carbide, silicon metal, and carbon graphite; and
   d. at least one inorganic impregnant.

10. A composite article comprising a carbon-graphite body partially embedded in a silicon carbide body and adhered thereto by a transition layer comprising silicon metal.

11. A composite article as claimed in claim 10 in which the transition layer further comprises a layer between the silicon metal and carbon-graphite, the layer being formed by reaction therebetween.

12. A composite article comprising a silicon carbide body partially embedded in a carbon-graphite body and adhered thereto by a transition layer comprising silicon metal.

13. A composite article as claimed in claim 12 in which the transition layer further comprises a layer between the silicon metal and carbon-graphite, the layer being formed by reaction therebetween.

14. A composite article comprising:
   a. a first body comprising silicon carbide;
   b. a second body of carbon-graphite; .
   c. a transition region joining the first and second bodies comprising a layer comprising silicon metal and a layer comprising silicon carbide, silicon metal, and carbon graphite.

15. The composite article according to claim 14, wherein the silicon carbide of the first body is reaction bonded silicon carbide.

16. The composite article according to claim 14, wherein the second body further comprises at least one impregnant.

17. The composite article according to claim 14, wherein the transition region further comprises an area comprising inclusions of carbon-graphite and silicon carbide.

* * * * *